US012664808B2

(12) United States Patent
Chen et al.

(10) Patent No.: US 12,664,808 B2
(45) Date of Patent: Jun. 23, 2026

(54) FAKE SIGNATURE DETECTION

(71) Applicant: Jumio Corporation, Palo Alto, CA (US)

(72) Inventors: Pei-I Chen, Montreal (CA); Giona Matasci, Vancouver (CA); Artem Voronin, Montreal (CA); Arnaud Roussel, Montreal (CA); Navaneeth Kamballur Kottayil, Edmonton (CA)

(73) Assignee: Jumio Corporation, Sunnyvale, CA (US)

( * ) Notice: Subject to any disclaimer, the term of this patent is extended or adjusted under 35 U.S.C. 154(b) by 556 days.

(21) Appl. No.: 17/957,297

(22) Filed: Sep. 30, 2022

(65) Prior Publication Data

US 2024/0112486 A1 Apr. 4, 2024

(51) Int. Cl.
*G06V 30/226* (2022.01)
*G06V 30/416* (2022.01)

(52) U.S. Cl.
CPC .......... *G06V 30/226* (2022.01); *G06V 30/416* (2022.01); *G06V 2201/07* (2022.01)

(58) Field of Classification Search
CPC ............... G06V 30/226; G06V 30/416; G06V 2201/07; G06V 40/00; G06V 30/22; G06V 30/10; G06V 30/40; G06V 30/41; G06V 30/00; G06N 3/02; G06F 21/30; G06Q 20/00
See application file for complete search history.

(56) References Cited

U.S. PATENT DOCUMENTS

| | | | |
|---|---|---|---|
| 10,719,596 B1 * | 7/2020 | Goodsitt | ................. G06F 21/32 |
| 12,266,203 B2 * | 4/2025 | Khmaissia | ....... G06V 30/19013 |
| 2008/0140552 A1 * | 6/2008 | Blaikie | .................. G06Q 40/00 |
| | | | 705/35 |
| 2011/0052065 A1 * | 3/2011 | Nepomniachtchi | .......................... |
| | | | G06V 30/1423 |
| | | | 382/186 |
| 2012/0070062 A1 * | 3/2012 | Houle | .................. G06V 30/133 |
| | | | 382/137 |
| 2020/0167772 A1 | 5/2020 | Chakraborty | |
| 2022/0366513 A1 * | 11/2022 | Vadlamudi | ............ H04L 9/3247 |

OTHER PUBLICATIONS

Betrand et al. A System Based On Intrinsic Features For Fraudulent Document Detection. 12th International Conference on Document Analysis and Recognition, Aug. 2013. (Year: 2013).*
Ferrer et al. Is It Possible to Automatically Identify Who Has Forged My Signature?: Approaching to the Identification of a Static Signature Forger. Mar. 2012. (Year: 2012).*
(Continued)

*Primary Examiner* — Michelle M Koeth
(74) *Attorney, Agent, or Firm* — Patent Law Works LLP

(57) ABSTRACT

The disclosure includes a system and method for fake signature detection including identifying, using one or more processors, within a document image a signature portion, the signature portion representing a signature; applying, using the one or more processors, one or more fake signature detection models to the signature portion; determining, using the one or more processors and the one or more fake signature detection models, whether the signature represented in the signature portion is a fake signature; and presenting, using the one or more processors, the determination.

18 Claims, 5 Drawing Sheets

404

APPLY AN INTER-SIGNATURE DETECTION MODEL
502

APPLY AN INTRA-SIGNATURE DETECTION MODEL BASED ON AN ANOMALOUS CONSISTENCY IN CHARACTER HEIGHT
504

APPLY AN INTRA-SIGNATURE DETECTION MODEL BASED ON AN ANOMALOUS CONSISTENCY IN CHARACTER WIDTH
506

APPLY AN INTRA-SIGNATURE DETECTION MODEL BASED ON AN ANOMALOUS CONSISTENCY IN CHARACTER SPACING
508

APPLY AN INTRA-SIGNATURE DETECTION MODEL BASED ON AN ANOMALOUS CONSISTENCY BETWEEN INSTANCES OF A CHARACTER WITHIN THE SIGNATURE
510

(56) References Cited

OTHER PUBLICATIONS

YouTube, "Signature Verification on Bank Cheque using Image processing Matlab Project Code" (Helonde) Jan. 18, 2020 [online]. Retrieved from the Internet <URL:https://www.youtube.com/watch?v=QuA_DuTpNAE> entire document, especially 0:03-0:23 (Year: 2020).*

Patacchiola et al., "Y-Autoencoders: disentangling latent representations via sequential-encoding," arXiv:1907.10949v1 [cs. CV], https://doi.org/10.48550/arXiv.1907.10949, Jul. 25, 2019 (Year: 2019).*

Li et al., "Catch Me If You Can," arXiv:1904.12627v1 [cs.CV], Apr. 18, 2019, https://doi.org/10.48550/arXiv.1904.12627 (Year: 2019).*

Betrand et al. A System Based On Intrinsic Features For Fraudulent Document Detection. 12th International Conference on Document Analysis and Recognition, Aug. 2013 [online]. Retrieved from the Internet <URL:https://hal.science/hal-00917080/file/RomainBertrand_A_System_Based_On_Intrinsic_Features_for_Fraudulent_Document_Detection_ICDAR13.pdf>, pp. 1 to 6, especially pp. 2 to 4, fig. 2a Aug. 2013.

Ferrer et al. Is It Possible to Automatically Identify Who Has Forged My Signature?: Approaching to the Identification of a Static Signature Forger. Mar. 2012 [online]. Retrieved from the Internet <URL:https://www.semanticscholar.org/paper/Is-It-Possible-to-Automatically-Identify-Who-Has-My-Ferrer-Ballester-Morales/d9832c2cb2b5822bf5b07f7d186220b9de8b9786>, pp. 1 to 6, especially pp. 2-6, fig. 1 Mar. 27, 2012.

Matcha, How to easily do Handwriting Recognition using Machine Learning. Jun. 20, 2022 [online]. Retrieved from the Internet <URL:https://nanonets.com/blog/handwritten-character-recognition/>, pp. 1 to 44, especially pp. 14 to 15. Jun. 20, 2022.

YouTube, "Signature Verification on Bank Cheque using Image processing Matlab Project Code" (Helonde) Jan. 18, 2020 [online]. Retrieved from the Internet <URL:https://www.youtube.com/watch?v=QuA_DuTpNAE> entire document, especially 0:03-0:23 Jan. 18, 2020.

Zhu et al. Signature Detection and Matching for Document Image Retrieval. IEEE Transactions on Pattern Analysis and Machine Intelligence, Nov. 2009 [online]. Retrieved from the Internet <URL:https://www.researchgate.net/publication/26820508_Signature_Detection_and_Matching_for_Document_Image_Retrieval>, pp. 1 to 36, especially pp. 5, 19-28. Nov. 2009.

PCT International Search Report and Written Opinion; Application No. PCT/US2023/074492 Jumio Corporation, International filing date of Sep. 18, 2023, date of mailing Jan. 25, 2024, 16 pages.

Gao et al., "An English Handwriting Evaluation Algorithm Based on CNNs," 2019 International Conference on Artificial Intelligence and Advanced Manufacturing (AIAM), Dublin, Ireland, Oct. 17, 2019, doi: 10.1109/AIAM48774.2019.00010, pp. 18-21.

John et al., "Disentangled Representation Learning for Non-Parallel Text Style Transfer," arXiv:1808.04339, available online at https://doi.org/10.48550/arXiv.1808.04339, 11 pgs.

* cited by examiner

400

IDENTIFY A SIGNATURE PORTION WITHIN A DOCUMENT
IMAGE
402

APPLY ONE OR MORE FAKE SIGNATURE DETECTION
MODELS TO THE SIGNATURE PORTION
404

DETERMINE WHETHER THE SIGNATURE REPRESENTED
IN THE SIGNATURE PORTION IS A FAKE SIGNATURE
406

PRESENTING THE DETERMINATION
408

TAKING AN ACTION BASED ON THE DETERMINATION OF
THE SIGNATURE
410

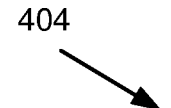

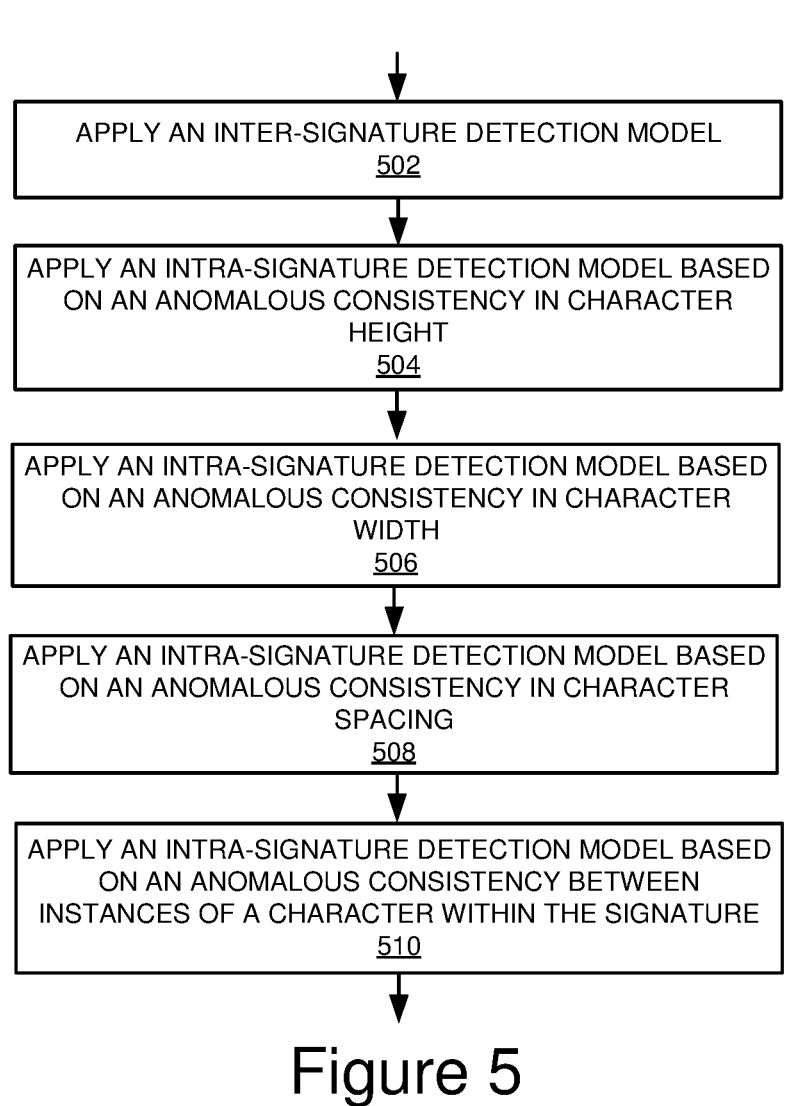

APPLY AN INTER-SIGNATURE DETECTION MODEL
502

APPLY AN INTRA-SIGNATURE DETECTION MODEL BASED ON AN ANOMALOUS CONSISTENCY IN CHARACTER HEIGHT
504

APPLY AN INTRA-SIGNATURE DETECTION MODEL BASED ON AN ANOMALOUS CONSISTENCY IN CHARACTER WIDTH
506

APPLY AN INTRA-SIGNATURE DETECTION MODEL BASED ON AN ANOMALOUS CONSISTENCY IN CHARACTER SPACING
508

APPLY AN INTRA-SIGNATURE DETECTION MODEL BASED ON AN ANOMALOUS CONSISTENCY BETWEEN INSTANCES OF A CHARACTER WITHIN THE SIGNATURE
510

Figure 5

FAKE SIGNATURE DETECTION

BACKGROUND

The present disclosure relates to image capture. More specifically, the present disclosure relates to capturing image data representing a document that includes a signature.

Documentation be provided for any number of reasons or in association with any number of transactions. For example, providing picture ID may be required to open a financial account to reduce the risk of fraud and/or to comply with laws (e.g., anti-money laundering or sanctions). In another example, an image of a check may be provided to deposit the check using a mobile banking application.

SUMMARY

This specification relates to methods and systems for identifying, using one or more processors, within a document image a signature portion, the signature portion representing a signature; applying, using the one or more processors, one or more fake signature detection models to the signature portion; determining, using the one or more processors and the one or more fake signature detection models, whether the signature represented in the signature portion is a fake signature; and presenting, using the one or more processors, the determination.

Other implementations of one or more of these aspects include corresponding systems, apparatus, and computer programs, configured to perform the actions of the methods, encoded on computer storage devices.

These and other implementations may each optionally include one or more of the following features. For instance, the features include identifying the signature portion includes performing object detection to detect the signature portion.

For instance, the features include applying the one or more fake signature detection models to the signature portion includes applying an inter-signature detection model, and include determining that the signature is a fake signature is based on the inter-signature detection model determining a commonality between the signature and other signature instances, the other signature instances associated with other document instances that include different information. For instance, the features include applying one or more fake signature detection models to the signature portion includes applying an intra-signature detection model, and wherein determining that the signature is a fake signature is based on the intra-signature detection model determining an anomalous consistency within the signature. For instance, the anomalous consistency includes anomalously consistent instances of a character used multiple times within the signature. For instance, the anomalous consistency includes one or more of anomalously consistent character height, anomalously consistent character width, and anomalously consistent character spacing. For instance, the intra-signature detection model is taught to learn the anomalous consistency using prior signatures as training data. For instance, the features include applying one or more fake signature detection models to the signature portion includes applying an intra-signature detection model, and wherein determining that the signature is a fake signature is based on the intra-signature detection model determining one or more characters within the signature are consistent with a computer font. For instance, the features include, based on determining that the signature is a fake signature, taking an action, wherein the action includes one or more of rejecting a user request, subjecting the user request to an additional authentication, contacting an authority, initiating a fraud case, and labeling the user request as fraudulent. For instance, the document is one of a government document, school document, financial document, and legal document.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is a flowchart of an example method for applying one or more fake signature detection models in accordance with some implementations.

DETAILED DESCRIPTION

Figure 1:
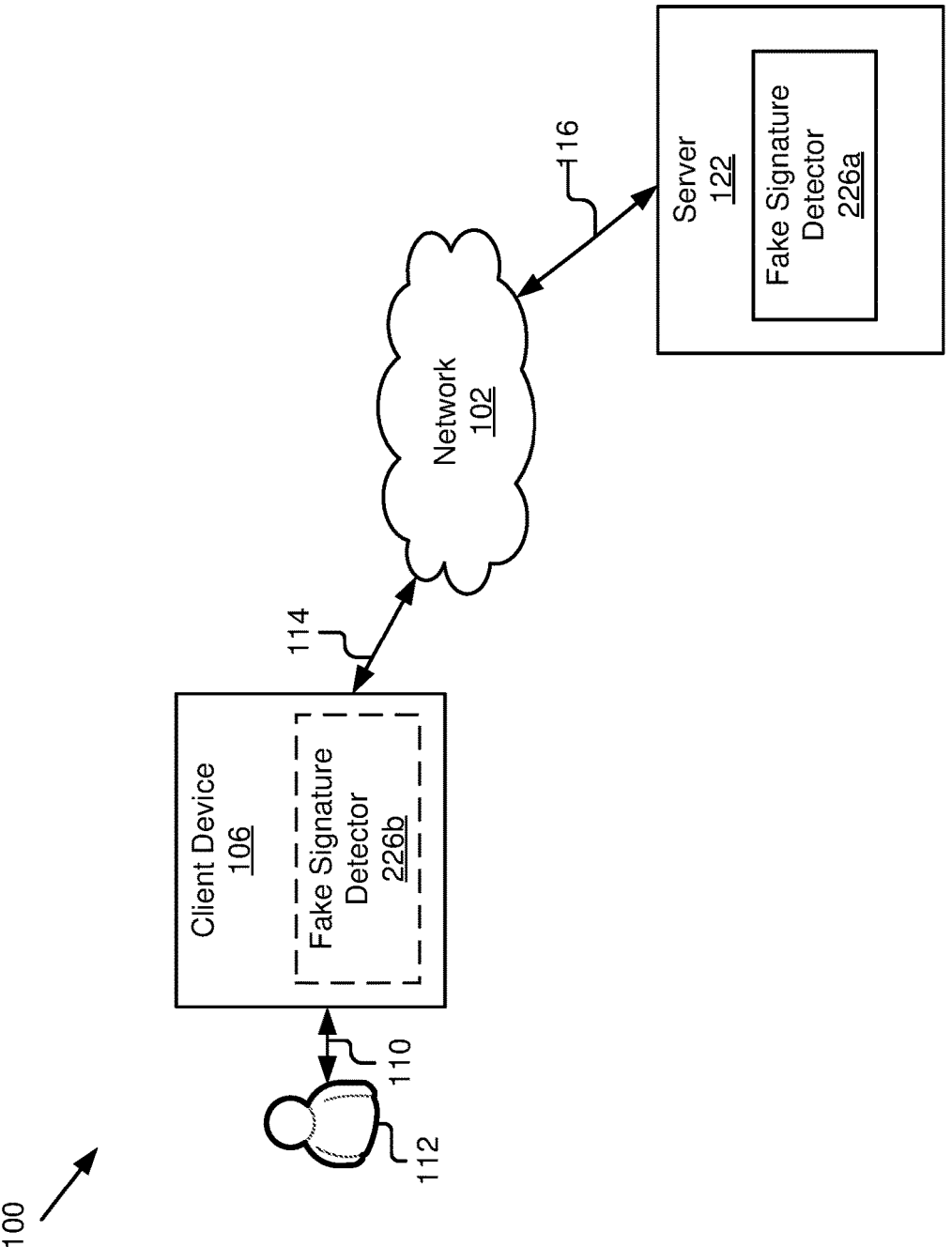
FIG. 1 is a block diagram of one example implementation of a system for fake signature detection in accordance with some implementations.

The present disclosure is described in the context of example fake signature detections and use cases; however, those skilled in the art should recognize that the fake signature detection may be applied to other environments and use cases without departing from the disclosure herein.

Documentation be provided for any number of reasons or transactions. For example, providing picture ID may be required to open a financial account to reduce the risk of fraud and/or to comply with laws (e.g., anti-money laundering or sanctions). In another example, an image of a check may be provided to deposit the check via a mobile banking application.

Increasingly, transactions are being performed remotely or electronically, e.g., online through web browsers or mobile applications. Users with nefarious intent (e.g., criminals, fraudsters, money launderers, etc.) may attempt to trick the systems and methods used to verify documentation provided remotely and electronically.

Advances in technologies have decreased the burden on nefarious users, thereby allowing the nefarious users to make more attempts with less effort, which may increase the odds that they eventually have a successful fraudulent attempt. Additionally, those advances in technology may increase the difficulty of preventing fraud in such remote, electronic transactions, particularly at scale. For example, image manipulation software (e.g., Adobe's Photoshop) has allowed users to quickly and easily manipulate and create different versions of documents or images thereof, such as fake IDs with different images or information in the various fields such as name). The fraudster may create and/or print out the various versions of the fraudulent (e.g., doctored) documentation and use the various versions in a series of attempts to successfully commit fraud. For example, the fraudster may perform a scripted attack.

Often, a nefarious user who repeatedly attempts to commit fraud does not use completely distinct documents or images of documents across his/her multiple attempts. For example, the fraudster uses a first instance of a document, then modifies the name in a second instance, then modifies the date of birth and ID number in a third instance, and so on, but there are commonalities between the attempts. An example of a potential commonality is a signature. Accordingly, identifying anomalously similar signatures in different document instances that are not associated with a common document (e.g., two ID images with different names or document numbers on the ID, and not two images the same person's ID) may beneficially reduce the number of successful fraudulent attempts.

Also, a nefarious user that wants to scale up the number of attempts to commit fraud is likely to leverage technology. For example, by copy-pasting a signature rather than manually creating a fresh, handwritten signature for each attempt. As another example, the nefarious user may use computer generated signature by using a font that resembles a hand-written signature. Detecting such computer aided signatures by a nefarious user may beneficially reduce the number of successful fraudulent attempts.

The fake signature detector 226 described herein may address, at least in part, one or more of the foregoing issues and/or provide, at least in part, one or more of the aforementioned benefits.

FIG. 1 is a block diagram of an example system 100 for partial image search in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in the example of FIG. 1, there may be any number of client devices 106 depending on the implementation. The system 100 depicted in FIG. 1 is provided by way of example and the system 100 and further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may optionally (as indicated by the dashed lines) include an instance of the fake signature detector 226a and the server 122 may include an instance of the fake signature detector 226a. However, in some implementations, the components and functionality of the fake signature detector 226 may be entirely client-side (i.e., at 226b), entirely server side (i.e., at 226a), or divide among the client device 106 and server 122 (i.e., divided across 226a and 226b). For example, as described below, some implementations may use machine learning (e.g., one or more algorithms to train one or more models), and the training and validation of the model(s) may be performed server-side at 226a and applied, during production, client side at 226b.

Figure 2:
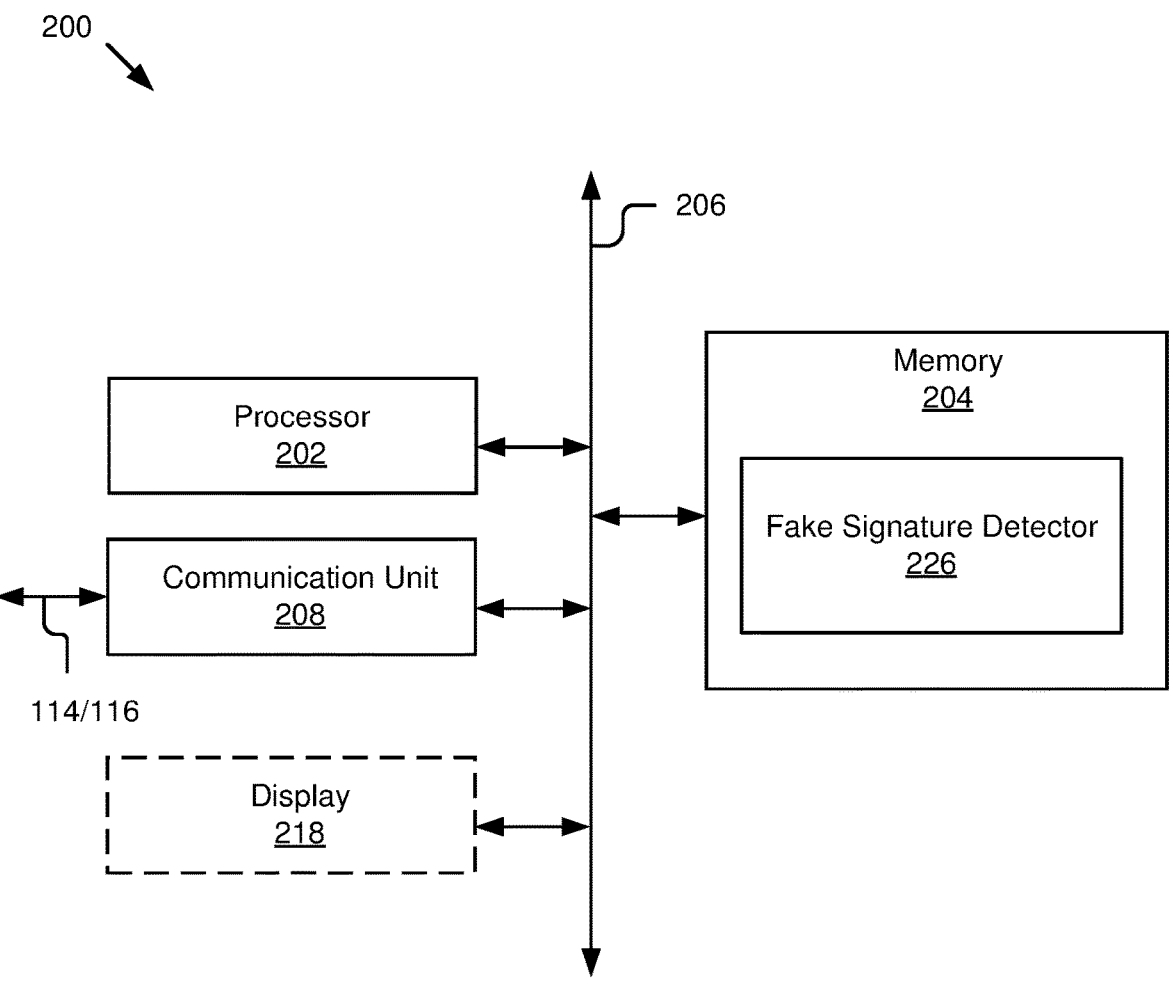
FIG. 2 is a block diagram of an example computing device in accordance with some implementations.

FIG. 2 is a block diagram of an example computing device 200 including an instance of the fake signature detector 226. The fake signature detector 226 which may refer to either instance 226a when the computing device 200 is a server 122, 226b where the computing device 200 is a client device 106, or a combination of 226a and 226b where the functionality is divided between 226b of the client device 106 and 226a of the server 122. In the illustrated example, the computing device 200 includes a processor 202, a memory 204, a communication unit 208, and a display 218.

In some implementations, the computing device 200 is a client device 106, the memory 204 stores the fake signature detector 226b, and the communication unit 208 is communicatively coupled to the network 102 via signal line 114. In some implementations, the computing device 200 is a client device 106, which may occasionally be referred to herein as a user device, and the client device 106 includes at least one sensor, e.g., a camera. In another implementation, the computing device 200 is a server 122, the memory 204 stores the fake signature detector 226a, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the fake signature detector 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. The memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 may include a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

In some implementations, the fake signature detector 226 provides the features and functionalities described below responsive to a request. For example, a request on behalf of an entity (not shown), such as a financial institution, to determine whether a user-provided document image (e.g., provided during a registration or customer onboarding) is legitimate or potentially fraudulent. As another example, a request by the user to capture a document (e.g., as part of a registration or customer onboarding).

Figure 3:
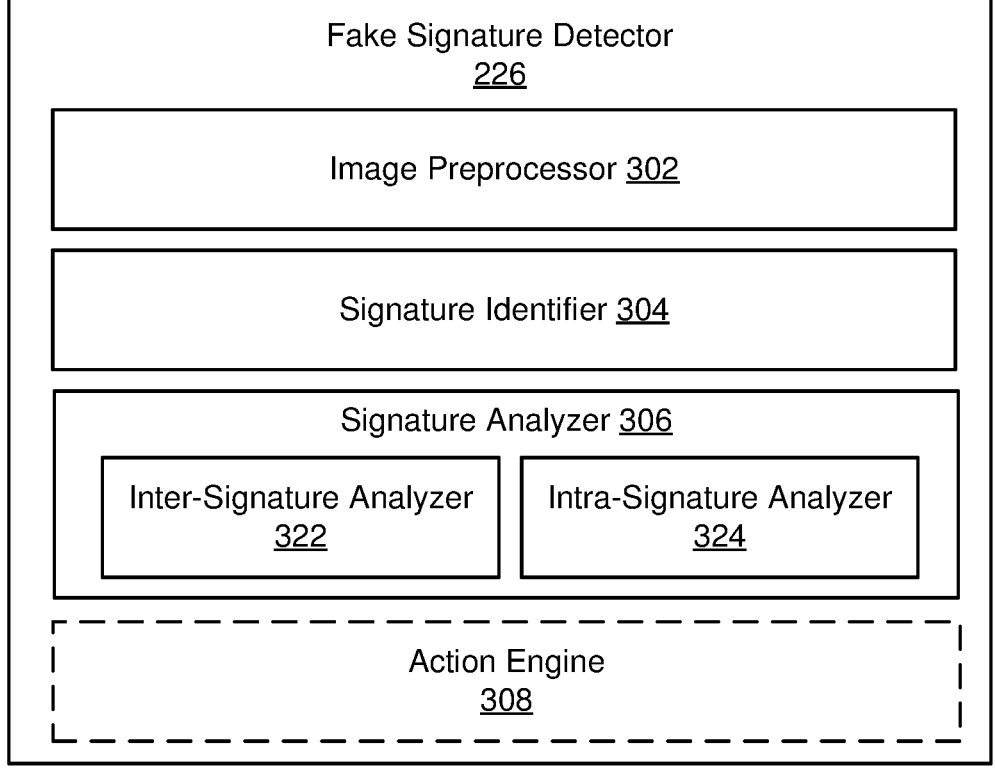
FIG. 3 is a block diagram of an example fake signature detector in accordance with some implementations.

Referring now to FIG. 3, a block diagram of an example of a fake signature detector 226 is illustrated in accordance with one implementation. As illustrated in FIG. 3, the fake signature detector 226 may include an image preprocessor 302, a signature identifier 304, a signature analyzer 306, and, optionally in some implementations, an action engine 308.

The image preprocessor 302 is communicatively coupled to receive image data representing a document that includes a signature. For example, in some implementations, the image preprocessor 302 receives image data captured by a camera sensor. Examples of image data may include, but are not limited to, one or more of an image and a video. For example, the received image data is captured by a camera sensor of the client device 106 responsive to the user 112 being prompted to take an image of the document (e.g., during a customer journey to open a financial account).

The image preprocessor 302 preprocesses image data. The preprocessing steps and their respective order may vary depending on the implementation. In some implementations, the image preprocessor 302 preprocesses image data by performing one or more of a rotation and a de-skew. For example, in some instances the document may be rotated slightly relative to the frame when the image data is captured and/or the image may be taken from a non-normal angle relative to the face of the document, thus a rectangular document may have some perspective distortion, or skew, and the interior angles of the four corners of the document, which should be ninety degrees differ. In some implementations, the image preprocessor 302 may detect the corners of the document and determine one or more transformation, e.g., to rotate the document so that an edge of the document is parallel to an edge of the image frame and/or a de-skew to generate a normalized view of the document (i.e., normalized in the sense that the view is along a vector normal to the face of the document and/or normalized in the sense that the result is in a normalized, or common, representation for subsequent processing, such as by the signature identifier 304.

The image preprocessor 302 outputs one or more preprocessed images representing a document. In some implementations, the image preprocessor 302 is communicatively coupled to the signature identifier 304 to send the preprocessed image to the signature identifier 304. In some implementations, the image preprocessor 302 stores the preprocessed image (e.g., in memory 204) for retrieval by the signature identifier 304.

In some implementations, the image preprocessor 302 may determine and output other information. For example, in some implementations, the image preprocessor 302 may extract other information from the document by applying optical character recognition and using the location, or field, in which the text is located to determine the role of the text. For example, the image preprocessor 302 may determine a first string of text as a first name, a second set of text as a last name, a numeric sequence as an ID number, etc. and label that other information accordingly. Depending on the implementation, the image preprocessor 302 may use machine learning to determine and label the other information. For example, the image preprocessor 302 may use a classifier to classify the document and use the known formatting and fields of that class of document to extract and label the other information. In another example, the image preprocessor 302 may use object detection to determine other information that is of interest. In some implementations, the other information may be used other components, e.g., by the inter-signature analyzer 322 as described below.

The signature identifier 304 obtains an image of a document and identifies a portion of the document that includes a signature. In some implementations, the signature identifier 304 obtains the preprocessed image generated by the image preprocessor 302. In some implementations, the signature identifier 304 may receive a raw, i.e., not preprocessed image and identify the portion that includes the signature in the raw image. In some of those implementations, the transformations (e.g., rotation and/or de-skew) discussed above may be performed on just the portion of the document that includes the signature.

Examples of the documents that may be subjected to the fake signature detection as described herein may include, but are not limited to, one or more of a government document (e.g., government issued ID such as a driver's license, passport, etc.; voter registration card, benefits card such as a social security card, etc.), a financial document (e.g., a personal or cashier's check, a credit card, a debit card, etc.), a legal document (e.g., a contract, loan agreement, change of beneficiary, etc.), a school document (e.g., a school ID), or other identification document (e.g., an employee ID). The method by which the signature identifier 304 identifies the portion of the document that includes the signature may vary based on the implementation and use case without departing from the scope of this disclosure.

In some implementations, the signature identifier 304 uses machine learning to identify the portion of the imaged document that includes the signature. The varieties of supervised, semi-supervised, and unsupervised machine learning algorithms that may be used, by the signature identifier 304 (i.e., trained, validated, retrained, and deployed) are so numerous as to defy a complete list. Example algorithms include, but are not limited to, a decision tree; a gradient boosted tree; boosted stumps; a random forest; a support vector machine; a neural network; a recurrent neural network; convolutional neural network; long short-term memory; transformer; logistic regression (with regularization), linear regression (with regularization); stacking; a Markov model; Markov chain; support vector machines; and others.

In some implementations, the signature identifier 304 may leverage the fact that the documents subjected to fake signature detection generally adhere to strict formatting. For example, in some implementations, the signature identifier 304 trains and subsequently applies a classification model to classify the document in the image. For example, the classifier may be trained on a data base of labeled document examples and, when deployed, determine a document type (e.g., passport, driver's licenses, etc.) and/or sub-type (e.g., based on the issuer, such as U.S. Passport, current version of the Utah Driver's License for a non-minor, etc.). In some implementations, based on the classification of the document, by the signature identifier 304, the signature identifier 304 may then determine the portion within the document that is supposed to include the signature based on the format for documents of that type (e.g., within a bounding box having dimensions A×B located X horizontally and Y vertically from a reference point), and may extract that signature portion of the image.

In some implementations, the signature identifier 304 may use object detection to identify a signature portion within an image of a document. The object detection applied by the signature identifier 304 may vary depending on the implementation and use case without departing from this disclosure. For example, in some implementations, the object detection may be based on deep learning and use a single-stage detector (e.g., single shot detectors "SSD" or you-only-look-once "YOLO"), while some implementations may use a two-stage detector (e.g., Faster R-CNN). As another example, in some implementations, the signature identifier 304 may train and use aggregate channel features, or support vector machine classification (e.g., using histogram oriented gradient features), etc.

The signature identifier 304 provides the identified signature portion to the signature analyzer 306 for analysis. In some implementations, the signature identifier 304 identifies the signature portion by providing location information that identifies where in the image (or preprocessed image) the signature portion is located and its dimensions. In some implementations, the signature identifier 304 identifies the signature portion by copying or extracting the signature portion from the image.

The signature identifier 304 may be communicatively coupled to the signature analyzer 306 and/or its subcomponents 322/324. For example, the signature identifier 304 may be communicatively coupled to the signature analyzer and send the signature portion to the signature analyzer 306. As another example, the signature identifier 304 may be communicatively coupled to the memory 204 to store the signature portion for retrieval by the signature analyzer and/or its subcomponents 322/324.

The signature analyzer 306 analyzes a signature to determine whether the signature is a fake signature. Depending on the implementation, a fake signature is one or more of an artificially reproduced signature (e.g., a copy-pasted signature or other reproduction of a signature or potion thereof) and a computer generated signature (e.g., using a font that looks like script).

In some implementations, the signature analyzer 306 uses one or more machine learning models to analyze a signature and determine whether the signature is a fake signature. The varieties of supervised, semi-supervised, and unsupervised machine learning algorithms that may be used, by the signature identifier 304 (i.e., trained, validated, retrained, and deployed) are so numerous as to defy a complete list. Example algorithms include, but are not limited to, a decision tree; a gradient boosted tree; boosted stumps; a random forest; a support vector machine; a neural network; a recurrent neural network; convolutional neural network; long short-term memory; transformer; logistic regression (with regularization), linear regression (with regularization); stacking; a Markov model; Markov chain; support vector machines; and others.

Additionally, depending on the implementation, the various machine learning models trained, by the signature analyzer 306, and deployed, by the signature analyzer 306, may or may not be based on a common machine learning algorithm or a common type (e.g., supervised, semi-supervised, or unsupervised) of machine learning algorithm. For example, the inter-signature analyzer 322 may train and deploy a first model based on a first machine learning algorithm, and the intra-signature analyzer 324 may train and deploy a second model that, depending on the embodiment, may be based on training another instance of the first algorithm or based on a second algorithm that may be of a same of different type to the first algorithm.

The signature analyzer 306 may perform an inter-signature analysis, an intra-signature analysis, or a combination of both depending on the implementation. As illustrated in FIG. 3, the signature analyzer 306 includes an inter-signature analyzer 322 and an intra-signature analyzer 324. In some implementations, signature analyzer 306 consists of convolutional neural networks trained to disentangle the style of the signature from the content of the signature. Such a model may be trained using the convolutional neural network as part of a variational autoencoder trained to perform a style transfer of text in some implementations, where style may refer to any characteristic of the handwritten/digitally generated signature that may be captured by the autoencoder. In some implementations, the style of the signature is compared with historic records of known fraudulent styles to identify fraudulent signatures. The content of the signature may be compared to other information such as first name or last name to identify fraud.

The inter-signature analyzer 322 performs inter-signature analysis. In some implementations, inter-signature analysis compares the signature received for analysis, represented in the signature portion, to other signature instances (e.g., previously received signatures, previously rejected signatures, previously approved signatures, etc.) to determine whether the signature received for analysis is a fake signature. In some implementations, the inter-signature analyzer 322 performs inter-signature analysis by applying an inter-signature detection model to determine whether the signature under analysis is similar to another, previously received signature, and responsive to determining that a similarity exists, determining whether or not the similar signatures are associated with a common document or not. Depending on the implementation and use case, the output of the inter-signature model may be discreet, such as "likely fake" or "not likely fake," as may be the case when a classifier, or may be continuous, such as a probability that the signature is fake, as may be the case with a regression model. In some implementations, the inter-signature detection model is based on a Siamese neural network or contrastive learning. In some implementations, the inter-signature detection model may perform inter-signature analysis based on hashes of the signature portion and other signature instances.

In some implementations, the inter-signature analyzer 322 compares other document information associated with the document under analysis and the document associated with the previously received, similar signature to determine whether the similar signatures are associated with a common document. For example, when the inter-signature analyzer 322 determines a previously received signature is similar to that of the document under analysis (e.g., a government ID), the inter-signature analyzer compares the name fields and ID number in the document under analysis (e.g., extracted using optical character recognition by the image preprocessor) to those fields associated with the document having the previously received, similar signature. In some implementations, when a match exists between the two sets of other information, the signature is determined, by the inter-signature analyzer 322, to be authentic, or at least not determined to be a fake signature based on inter-signature analysis, as such may be the case if a user has previously been asked to photograph his/her ID.

In some implementations, when a mismatch exists between the two sets of other information, the signature is determined, by the inter-signature analyzer 322, to be a fake signature, as it is highly unlikely similar, or nearly identical, signatures would be associated with two different names. It should be recognized that the preceding example in which other information includes one or more of a name and an ID number are merely one example of other information, which may be used by the inter-signature analyzer 322 to determine a common document or lack of commonality between documents. Examples of other information that may be used by the inter-signature analyzer 322 without departing from the disclosure herein include, but are not limited to, one of more of first name, last name, photograph, document number (e.g., driver's license number, passport number, card number, etc.), gender, age, date of birth, eye color, hair color, etc.

The intra-signature analyzer 324 analyzes the signature for indications within the signature received for analysis that the signature received for analysis is a fake signature. For example, the intra-signature analyzer 324 receives the signature portion and applies one or more intra-signature detection models to the signature portion and determines whether the signature is fake. In some implementations, the intra-signature analyzer 324 performs intra-signature analysis by applying one or more intra-signature detection models to determine whether the signature under analysis includes one or more anomalous consistencies. In some implementations, the intra-signature detection model comprises a convolutional neural network. In some implementations, the intra-signature detection model comprises an object detector. For example, an object detector with two classes, such as "likely fake" and "not likely fake." Depending on the implementation and use case, the output of the intra-signature model(s) may be discreet, such as "likely fake" or "not likely fake," as may be the case when a classifier, or may be continuous, such as a probability that the signature is fake, as may be the case with a regression model. In some implementations, techniques to identify digital manipulations in the image (e.g., using textures, statistical inconsistency, etc.) may be used to provide additional signals for the classification task. In some implementations, intra-signature detection model(s) may be pre-trained to perform a specific auxiliary task like font identification, and concepts of transfer learning may be applied to reduce the number of samples needed to train the neural network comprising the intra-signature detection model(s). In some implementations, active learning based sample selection for labeling may be used to reduce the number of samples needed to train the neural network comprising the intra-signature detection model(s).

The set of anomalous consistencies the intra-signature 324 and its associated model(s) may detect may vary depending on the implementation and use case. Examples of anomalous consistencies may include but are not limited to one or more of a consistency with a computer font (e.g., Lucidia Console, which is a font sometimes used for electronic signatures), consistent character height between characters within the signature (e.g., the height of the two "t"s in "Matthew" and/or the height of the "a," "e," and "w"), consistent character width between characters within the signature (e.g., the width of the "a" and "e" in "Matthew"), consistent character spacing between multiple characters within the signature, and consistent instances a character used multiple times within a signature (e.g., the degree of identicality between the two instances of "t" in "Matthew"). A person's hand-written signature generally exhibits inconsistencies multiple instances of a character within a signature have slight variations (e.g., height, width, slant, arc radius, thickness, etc.), the spacing between letters may vary slightly, the height and/or width may vary slightly from character to another. The one or more intra-signature detection model(s) are trained to detect the presence of anomalous consistencies (or the presence of inconsistencies, depending on the implementation) and determine that the signature is a fake (or not a fake, respectively). In some implementations, the anomalous consistencies (e.g., in character heights, spacing, width, ratio of width to height, etc.) may be explicitly encoded, in full or in part. In some implementations, the anomalous consistencies are learned, e.g., by training a neural network, as an intra-signature detection model, to identify the presence of one or more anomalous consistencies. In some implementations, automated tools to measure handwriting quality (artificial neural networks trained for detecting English handwriting quality or other off the shelf API) may be used to quantify the overall statistics of the various inconsistencies above.

The signature analyzer 306 presents the result of the signature analysis. For example, the signature analyzer 306 presents the result of the inter-signature analysis and/or intra-signature analysis. The signature analyzer 306 presents the results to the user in some implementations, e.g., by presenting a notification to the user, according to some implementations. The signature analyzer 306 presents the results to the action engine 308 according to some implementations.

The action engine 308 determines and, in some implementations, initiates an action based on the result of the signature analysis by the signature analyzer 306 or the subcomponent(s) 322/324 thereof. Examples of actions include, but are not limited to one or more of to accept or reject the request or document image; to contact authorities, to escalate the request for investigation (e.g., an investigation of fraud), confirmation (e.g., by a human or other machine learning model); to apply additional verification checks, etc.

In some implementations, the decision engine 332 makes a determination based at least in part on a number of similarities. For example, when a signature is determined to be similar to a greater number of other signature instances in the inter-signature analyzer, it may be a stronger signal, i.e., more indicative, of fraud, and the action engine 308 may determine to act accordingly. For example, when relatively few instances are identified in the inter-signature analysis, the user's request is subjected to additional verifications, but when a great number of instances are identified (e.g., above a threshold), a fraud case is initiated and/or authorities are notified. As another example, the more identical characters within a signature and/or the more characters with one or more of anomalously consistent height, width, or spacing, the more likely the signature was computer generated, or not a human signature, and, in some implementations, the more likely the action engine 308 is to deny the users request, e.g., rather than apply an additional verification step to the request.

In some implementations, the decision engine 332 uses machine learning, e.g., to determine one or more of the parameters/criteria and/or values used to make which decision(s) may be determined by training, validating, and retraining one or more machine learning algorithm(s).

Example Methods

Figure 4:
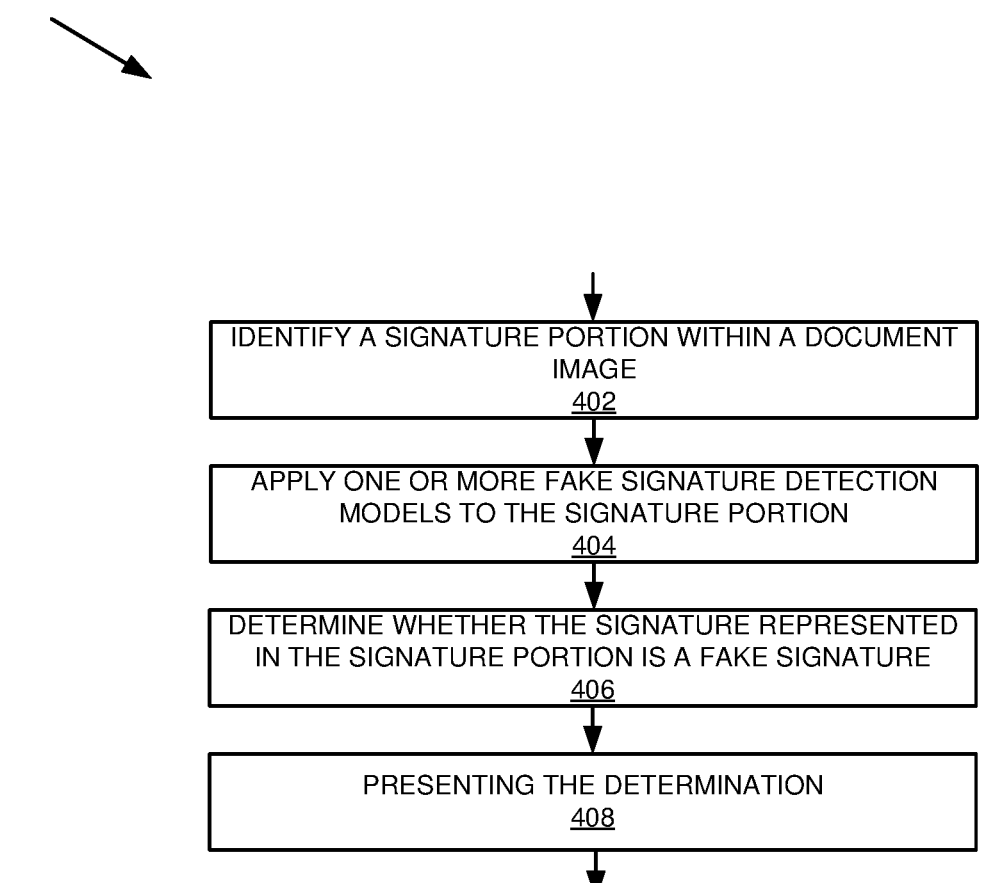
FIG. 4 is a flowchart of an example method for fake signature detection in accordance with some implementations.

FIGS. 4 and 5 are flowcharts of example methods that may, in accordance with some implementations, be performed by the systems described above with reference to FIGS. 1-3. The methods 400 and 404 of FIGS. 4 and 5, respectively, are provided for illustrative purposes, and many variations exist and are within the scope of the disclosure herein.

FIG. 4 is a flowchart of an example method 400 for fake signature detection in accordance with some implementations. At block 402, the signature identifier 304 identifies a signature portion within a document image. At block 404, the signature analyzer 306 applies one or more fake signature detection models to the signature portion. At block 406, the signature analyzer 306 determines whether the signature represented in the signature portion is a fake signature. At block 408, the signature analyzer 306 presents the determination as to whether the signature represented in the signature portion is a fake signature. At block 410, the action engine 308, optionally in some implementations, takes an action based on the determination at block 406.

FIG. 5 is a flowchart of an example method 404 for applying one or more fake signature detection models in accordance with some implementations. At block 502, the inter-signature analyzer 322 applies an inter-signature detection model. At block 504, the intra-signature analyzer 324 applies an intra-signature detection model based on an anomalous consistency in character height. At block 506, the intra-signature analyzer 324 applies an intra-signature detection model based on an anomalous consistency in character width. At block 508, the intra-signature analyzer 324 applies an intra-signature detection model based on an anomalous consistency in character spacing. At block 510, the intra-signature analyzer 324 applies an intra-signature detection model based on an anomalous consistency between instances of a character within the signature.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer-readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:

identifying, using one or more processors, within a document image captured using a camera, a signature portion of the document image, the signature portion representing a signature in the document image, the document image captured by a camera;

applying, using the one or more processors, a variational autoencoder to the signature portion of the document image, wherein the variational autoencoder disentangles a style of the signature portion of the document image from a content of the signature portion of the document image;

determining, using the one or more processors, whether the signature represented in the signature portion of the document image is a fake signature including:

determining, using an inter-signature detection model, whether a commonality exists between the signature represented in the document image and other signature instances, wherein the commonality is based on one or more of the content of the signature portion of the document image and the style of the signature portion of the document image; and determining, using an intra-signature detection model, whether an anomalous consistency exists between a first character and a second character, wherein the first character and second character are characters within the signature represented in the document image; and presenting, using the one or more processors, the determination.

2. The method of claim 1, wherein identifying the signature portion of the document image includes:

performing object detection to detect the signature portion of the document image.

3. The method of claim 1, wherein the other signature instances are associated with other document instances that include different content information.

4. The method of claim 1, wherein the first character and the second character are different instances of a same character used multiple times within the signature.

5. The method of claim 1, wherein the anomalous consistency includes one or more of anomalously consistent character height, anomalously consistent character width, and anomalously consistent character spacing.

6. The method of claim 1, wherein the intra-signature detection model is taught to learn the anomalous consistency using prior signatures as training data.

7. The method of claim 1, wherein determining that the signature is fake is based on the intra-signature detection model determining one or more characters within the signature are consistent with a computer font.

8. The method of claim 1, further comprising:

based on determining that the signature is fake, taking an action, wherein the action includes one or more of rejecting a user request, subjecting the user request to an additional authentication, contacting an authority, initiating a fraud case, and labeling the user request as fraudulent.

9. The method of claim 1, wherein the document is one of a government document, school document, financial document, and legal document.

16

10. A system comprising:

one or more processors; and a memory, the memory storing instructions that, when executed by the processor, cause the system to:

identify, within a document image captured using a camera, a signature portion, the signature portion representing a signature;

apply a variational autoencoder to the signature portion of the document image, wherein the variational autoencoder disentangles a style of the signature portion of the document image from a content of the signature portion of the document image;

determine whether the signature represented in the signature portion of the document image is a fake signature including:

determining, using an inter-signature detection model, whether a commonality exists between the signature represented in the document image and other signature instances, wherein the commonality is based on one or more of the content of the signature portion of the document image and the style of the signature portion of the document image; and determining, using an intra-signature detection model, whether an anomalous consistency exists between a first character and a second character, wherein the first character and second character are characters within the signature represented in the document image; and present the determination.

11. The system of claim 10, wherein the instructions for identifying the signature portion of the document image further cause the system to:

perform object detection to detect the signature portion.

12. The system of claim 10, wherein the other signature instances associated with other document instances that include different content information.

13. The system of claim 10, wherein the first character and the second character are different instances of a same character used multiple times within the signature.

14. The system of claim 10, wherein the anomalous consistency includes one or more of anomalously consistent character height, anomalously consistent character width, and anomalously consistent character spacing.

15. The system of claim 10, wherein the intra-signature detection model is taught to learn the anomalous consistency using prior signatures as training data.

16. The system of claim 10, wherein determining that the signature is fake is based on the intra-signature detection model determining one or more characters within the signature are consistent with a computer font.

17. The system of claim 10, wherein the instructions further cause the system to:

based on determining that the signature is fake, take an action, wherein the action includes one or more of rejecting a user request, subjecting the user request to an additional authentication, contacting an authority, initiating a fraud case, and labeling the user request as fraudulent.

18. The system of claim 10, wherein the document is one of a government document, school document, financial document, and legal document.

* * * * *